3,780,107
CONTINUOUS PROCESS FOR PRODUCING LONG CHAIN AMINES
Bohdan S. Polanskyj, South Orange, and Jack M. Solomon, West Caldwell, N.J., Daniel R. Chisholm, Mount Vernon, N.Y., and Bernard R. Bluestein, Glen Rock, N.J., assignors to Witco Chemical Corporation, New York, N.Y.
No Drawing. Filed Aug. 5, 1970, Ser. No. 61,470
Int. Cl. C07c 87/04, 87/14, 87/127
U.S. Cl. 260—583 P                           8 Claims

ABSTRACT OF THE DISCLOSURE

Long chain amines are produced in a continuous process at atmospheric pressures by reacting long chain $C_6$ to $C_{26}$ monochlorinated or monobrominated hydrocarbons with a stoichiometric excess of lower molecular weight alkyl, alkylene or alkanol amines by adding reactants so as to continuously maintain said stoichiometric excess of amine and continuously withdrawing from the liquid reaction mixture long chain amine product and unreacted ingredients and separating said product therefrom.

---

This invention relates to a process for preparing long chain amines from substantially monobrominated or monochlorinated long chain hydrocarbons. More particularly, this invention relates to a novel, continuous method for producing long chain amines in a liquid phase process at atmospheric pressures in commercial yields.

Numerous processes and procedures for producing long chain amines from long chain halogenated hydrocarbons have been disclosed in the prior art. Examples of heretofore known techniques may be found in U.S. Pat. No. 3,371,118 wherein primary chloroalkanes are selectively aminated with acyclic amines in the presence of a polar solvent; 3,294,851, in which a mixture of primary and secondary aliphatic hydrocarbon chlorides are separated by selectively aminating the primary alkyl chloride with a dialkylamine, preferably in a closed autoclave-type reaction vessel; 3,287,411, in which only secondary monochlorinated linear saturated hydrocarbons are reacted with primary and secondary amines under pressure to produce the corresponding aliphatic amine product; 3,385,893, in which $C_{10}$ to $C_{20}$ straight chain paraffins are partially chlorinated and reacted with an alkyl secondary amine at elevated temperatures to form an alkyl tertiary amine, the amination being carried out batchwise, under pressure, over a period of 4 to 20 hours and preferably with addition of a polar solvent; 3,379,764, which shows the preparation of trialkylamines from $C_{10}$ to $C_{20}$ alkyl-bromides, water and dialkylamines in two critical reaction stages carried out at two different ranges of temperatures, the procedure being carried out batchwise or continuously. Also, U.S. Pat. No. 3,388,979 discloses methods of preparing long chain amines from alkyl chlorides and alkyl bromides by reacting same with amines over long periods of time at elevated temperatures and pressures to produce products useful as gasoline additives, and U.S. Pat. 3,299,142 teaches the high pressure ammonolysis of alkyl halides.

In summary, processes heretofore known have generally required either elevated pressures and closed reaction systems, or batchwise reactions, or polar solvents or, and especially so, very long periods of reaction time as essential conditions, which necessarily increase manufacturing and equipment costs, in order to realize commercially satisfactory production of long chain amines by amination of primary and/or secondary chlorinated or brominated long chain hydrocarbons with lower molecular weight amines. The prior art fails to disclose or suggest that long chain amines may be efficiently and economically produced in a simple, continuous liquid phase process at atmospheric pressures with relatively short reaction times and at only moderately elevated temperatures as more fully described herein.

In accordance with this invention, it has been discovered that long chain amines may be prepared in a liquid phase, continuous process comprising:

(1) Continuously maintaining in a reaction vessel a liquid reaction mixture containing (a) monochlorinated or monobrominated $C_6$ to $C_{26}$ hydrocarbons and (b) a stoichiometric excess of a member selected from the group consisting of normally liquid primary $C_2$ to $C_6$ alkyl amines, $C_2$ to $C_6$ alkylene amines and $C_2$ to $C_6$ alkanolamines;

(2) Effecting reaction between said (a) and (b) ingredients to produce said long chain amines, said reaction being carried out at atmospheric pressure, at a temperature of from about 50° C. to 250° C. and in the absence of added solvent;

(3) Continuously withdrawing from said vessel the reacted mixture containing said long chain amine and unreacted ingredients, and (4) Separating said long chain amine from said drawn off reacted mixture.

The brominated or chlorinated long chain paraffins as used herein generally comprise those having between 6 and 26 carbon atoms and being substantially monobrominated and monochlorinated hydrocarbons and containing only small portions of polychlorinated or polybrominated products. These hydrocarbons may be straight or branched chain alkyl bromides or alkyl chlorides, but straight chain materials are preferred. Hydrocarbons having the chlorine or bromine attached to a primary or secondary carbon atom may be employed, as well as mixtures of hydrocarbons containing both primary and secondary monochlorinated or monobrominated paraffins. The aforesaid hydrocarbon feedstock may be prepared by numerous known techniques such as by the reaction of HCl or HBr with a suitable olefin with or without peroxide catalyst or by partially chlorinating or partially brominating a long chain paraffin mixture so as to produce substantially monochlorinated or monobrominated products. The aforesaid chlorinated or brominated hydrocarbons may be used as such in the process of the present invention or, as in the case when the feedstock is produced by partially chlorinating or partially brominating a paraffin hydrocarbon, they may be present in a solution of long chain hydrocarbon. It should be noted that the presence of an added solvent or diluent is not critical to the practice of the process of the present invention.

Thus, an especially valuable feedstock for the process of the present invention is a paraffin-chloroparaffin mixture of $C_8$ to $C_{18}$ straight chain hydrocarbons such as is produced by partially chlorinating a mixture of hydrocarbons which has been isolated from fractions such as kerosene by the use of molecular sieves or a urea adduction technique. These products, to insure the presence of essentially monochlorinated hydrocarbons, are chlorinated only to the extent of about 10 to 30 mol percent. Of special preference for the process of the present invention is a paraffin-chloroparaffin mixture of $C_9$ to $C_{14}$ straight chain hydrocarbons which contains about 30% monochlorinated paraffins in which the isomeric distribution is about 20% 1-chloro, 20% 2-chloro and the balance a random distribution of 3-, 4-, 5-, 6- and 7-chloro isomers of the monochlorinated paraffins.

Thus, suitable examples of chloride and bromide mixtures which may serve as reactants according to the process of the present invention are mixtures of primary and secondary chlorides or bromides of octane, nonane, decane, undecane, dodecane, tridecane, tetradecane, pentadecane, hexadecane, heptadecane and octadecane. Also suitable are pure 1- and 2-chloro compounds of which 1-chlorodecane, 2-chlorodecane, 1-chlorotetradecane, 2-bromoundecane and 2-bromododecane are illustrative examples.

The primary amines suitable for use herein generally comprise the normally liquid lower molecular weight alkyl amines, alkylene amines and alkanolamines, more specifically those of the aforesaid having from about 2 to 6 carbon atoms. These include polyamines as well as monoamines.

Illustrative examples of primary amines useful for practicing the process of the present invention are propylamine, butylamine, isobutylamine, hexylamine and the like; alkanolamines such as ethanolamine, propanolamine, butanolamine and isopropanolamine and others which may contain up to 6 carbon atoms; and alkyleneamines exemplified by ethylenediamine, diethylenetriamine, propylenediamine, butylenediamine, hexamethylenediamine and similar compounds. Especially suitable are the ethylene polyamines such as ethylenediamine and diethylenetriamine.

In practicing the process of the present invention, the chlorinated or brominated hydrocarbon reactant and the amine reactant are first brought together in a suitable reaction vessel with a stoichiometric excess of amine being present and most suitably and preferably substantially greater excesses of amine over halogenated hydrocarbon, in the order of about 2 mols to 500 mols of amine per mol of halogenated hydrocarbon reactant and preferably from about 20 to 50 mols of amine per mol of chlorinated or brominated hydrocarbon, which ratios are maintained throughout the course of the process.

In carrying out the continuous process a body of liquid amine is first introduced into the reaction vessel, a vertical cylindrical glass reactor, and the temperature is raised to between about 50° C. and 250° C. and, preferably, 90° C. to 110° C. A stream of chlorinated or brominated hydrocarbon is then introduced into the bottom of the reaction vessel so as to make immediate contact with said amine, the reactants being agitated during the residence time of the hydrocarbon in the reaction zone. Use of this technique, i.e. passing a stream of halogenated hydrocarbon into amine, insures the presence of the necessary excess of amine. Thereupon, as reacted and unreacted ingredients are drawn off, the molar proportions of reactants in the reaction zone are continuously held at the optimum ratios by controlling the flow of additional amine reactant thereto and metering the rate of addition of the chlorinated or brominated long chain hydrocarbon. Generally, for a given quantity of halogenated hydrocarbon feed, only a relatively short reaction residence time up to about 20 minutes is required and the feedstock is metered into the reaction vessel accordingly.

The continuous withdrawal of reaction product and any unreacted ingredients is easily effected by drawing off the liquid at the surface of the reaction mixture, since a layered system forms, the lower part of which contains the agitated reaction mixture of amine and chlorinated or brominated hydrocarbon and an upper phase containing reaction product and unreacted ingredients and solutions of same in unreacted long chain alkyl chloride or bromide. For all reactants described herein, a certain degree of phase sparation occurs and the continuous withdrawal of product is effected from upper part of the reaction vessel which is rich in long chain amine product.

The continuously drawn off portion of the reaction mixture contains long chain amine product, unreacted brominated or chlorinated hydrocarbons, pure hydrocarbons, if such were part of the feedstock, unreacted amine and any other complex products formed. As a general rule, any unreacted amine separates as a bottom layer upon cooling of the drawn off stream and it may be recycled directly to the reaction mixture or purified and then recycled. The long chain amine product is then separated from the other materials by any one of a variety of conventional techniques such as distillation, solvent extraction of the long chain amine product, for instance, with methanol, addition of an aqueous acidic solution to the product whereby to form a hydrocarbon upper layer and aqueous lower layer containing said product and other similar techniques. The optimum technique will, of course, depend upon the peculiar properties of reactants and products.

A particularly preferable mode of separating the long chain amine product from the reactor effluent comprises introducing the reaction product, after the unreacted amine is separated by cooling, into a carbonation unit and injecting water and $CO_2$ gas which results in a long chain amine-carbonate complex which is water-soluble. This mixture is then mixed with methanol and any chloro- or bromoparaffin-paraffin separates from a solution of the product complex in water and methanol. The methanol is then volatilized and an aqueous layer of long chain amine-carbonate complex is isolated. Water is then stripped off in a thin film evaporator with the carbonate complex breaking down so as to liberate the essentially pure long chain amine product. This technique is of particular utility when the feedstock employed is a paraffin-chloro- or bromoparaffin mixture containing about 10% to 30% monochlorinated or monobrominated hydrocarbons.

The range of operating temperatures comprises a broad range from about 50° C. up to about 250° C. Preferably, the reaction will be carried out at a temperature between about 90° C. and 110° C. The process is particularly advantageous in that it is carried out at atmospheric pressure. Furthermore, the yields of products are in the order of 98–100%, and this is of particular commercial significance.

The long chain amine products, as produced herein, have numerous and varied uses in the art, such as surface active agents, corrosion inhibition agents, gasoline and lubricating oil additives, ore flotation agents, epoxy curing agents and as valuable intermediates in the organic synthesis of materials such as amine oxides.

The following examples are illustrative of the practice of the present invention but are not to be considered as limitative of its scope.

EXAMPLE 1

Into a vertically positioned tubular glass reactor is introduced 280 mols of ethylenediamine and 7 mols of monochlorinated straight chain $C_9$ to $C_{14}$ paraffins ($C_{11.5}$ average) in straight chain $C_9$ to $C_{14}$ paraffins which had been prepared by partially chlorinating a straight chain $C_9$ to $C_{14}$ fraction isolated from kerosene employing molecular sieves. The reactants become distributed in a lower layer of ethylenediamine and an upper layer consisting of paraffin-chloroparaffin mixture. The reaction is carried out at a temperature of 90° C. to 110° C. and, as the reaction proceeds, ethylenediamine is continuously metered into the upper part of the tubular reactor and paraffin-chloroparaffin mixture is continuously metered into the lower part of the vessel so as to maintain a constant approximately 40:1 molar ratio of ethylenediamine to chlorinated paraffin throughout the course of the process.

The long chain amine product formed becomes distributed in the upper layer of the reaction mixture in the form of a mixture of long chain amine product, ethylenediamine and chloroparaffin-paraffin. This effluent is continuously drawn off and contains about 87% chloroparaffin-paraffin, 10% ethylenediamine and about 3% long chain amine product.

The effluent is passed into a cooler maintained at a temperature of 20° C. to 30° C. and the ethylenediamine is separated and recycled to the reactor. The reaction product mixture is then washed in a 20% to 50% ethylenediamine-water solution which further reduces the ethylenediamine content to less than 0.5% of the reaction product mixture.

The reaction product mixture is then passed into a carbonation unit where $CO_2$ gas and water are added with vigorous agitation and a long chain amine-carbonate complex is formed which is passed into a separator unit and the long chain amine-carbonate complex is drawn off as a lower layer.

The long chain amine product is purified by removal of dissolved chloroparaffin-paraffin by the addition of methanol and extraction of the long chain amine-methanol solution, and stripping of the methanol results in an aqueous long chain amine-carbonate layer. The water is stripped off in a thin film evaporator and the carbonate decomposes giving off $CO_2$ gas to form the long chain amine product. The product isolated is an N-alkylethylenediamine, $C_{11.5}H_{24}NHCH_2CH_2NH_2$, composed of about 50% 1-isomer, 20% 2-isomer and 30% internal distribution of the substituent amino group. It has a neutralization equivalent of 110 and an amine value of 510. The product isolated has a purity of about 96% with about 3.5% chloroparaffin-paraffin and less than 0.5% water. The yield is about 99% based upon the weight of ethylenediamine reactant consumed over a 10 hour run.

EXAMPLE 2

Example 1 is repeated except that the hydrocarbon feedstock employed is a mixture of 1-bromotetradecane and 1-bromohexadecane prepared from the addition of HBr in the presence of peroxide catalyst to a mixture of alpha olefins consisting of 75% 1-tetradecene and 25% 1-hexadecene. A yield of approximately 99% alkylated ethylenediamine is obtained over the course of an 8 hour run.

EXAMPLE 3

Following the procedure of Example 1, 25 mols of ethylenediamine and 5 mols of pure 1-chloro-n-tetradecane are introduced into the tubular glass reactor and the reaction is allowed to proceed at a temperature of about 100° C. for a period of 20 hours while continuously withdrawing reaction product from the surface and adding reactants so as to maintain a 5:1 molar ratio of ethylenediamine to 1-chloro-n-tetradecane. A yield of about 99% by weight N-tetradecyl ethylenediamine is obtained, based on the quantity of ethylenediamine metered into the reaction vessel over the course of the run.

EXAMPLE 4

Again, following the procedure of Example 1, 30 mols of ethanolamine and 15 mols of 1-chloro-n-octadecane are introduced into the tubular glass reactor and the reaction is allowed to proceed at a temperature of 170° C. for a period of 72 hours while continuously withdrawing reaction product from the surface and continuously adding reactants throughout the course of the reaction so as to maintain a 2:1 molar ratio of ethanolamine to the chlorooctadecane. A yield of 98% N-octadecylethanolamine is obtained.

EXAMPLE 5

Example 4 is repeated with equivalent results except that isobutylamine is employed in place of ethanolamine and the reaction temperature is 55° C. to 60° C.

EXAMPLE 6

There is reacted, according to the procedure of Example 1, 800 mols of hexamethylene diamine and 2 mols of a monochlorinated mixture of hydrocarbons (based on the average molecular weight), the mixed hydrocarbons being present in the following weight proportions: 30% tetradecane, 20% octadecane, 20% eicosane, 10% tetracosane, 10% tricosane and 10% pentacosane. The reaction is carried out at 200° C. for a period of 10 hours and the corresponding N-alkyl substituted hexamethylenediamine is recovered in yields of about 95%.

What is claimed is:
1. A continuous process for producing long chain amines which comprises:
(A) continuously maintaining in a reaction vessel and under conditions of agitation, a body of a liquid reaction mixture containing reactants consisting essentially of (a) a member selected from the group consisting of monochlorinated and monobrominated $C_6$ to $C_{26}$ straight and branched chain paraffin hydrocarbons and (b) a molar excess of a member of the group of primary $C_2$ to $C_6$ alkyl amines, primary $C_2$ to $C_6$ alkylene amines and primary $C_2$ to $C_6$ alkanolamines; said molar excess being in the range of 2 to 500 mols of said amine per mol of said hydrocarbon;
(B) continuously effecting reaction between said (a) and (b) ingredients in said reaction vessel to produce said long chain amines, said reaction being carried out at atmospheric pressure at a temperature in the range of about 50° C. to 250° C. and in the absence of added solvent;
(C) continuously introducing said monochlorinated or monobrominated $C_6$ to $C_{26}$ hydrocarbon into the lower part of said reaction vessel and continuously withdrawing from the upper part of said reaction vessel reacted mixture containing the long chain amine and unreacted ingredients; and
(D) separating the long chain secondary amine from said drawn off reacted mixture.

2. A process according to claim 1 wherein said hydrocarbon is a monochlorinated $C_8$ to $C_{18}$ straight-chain, petroleum-derived hydrocarbon.

3. A process according to claim 2 wherein said monochlorinated hydrocarbon is a member of the group of 1-chloro and 2-chloro isomers and mixtures of same.

4. A process according to claim 1 wherein said hydrocarbon is a paraffin-chloroparaffin mixture of $C_9$–$C_{14}$ straight chain hydrocarbons containing about 30% monochlorinated paraffins wherein the isomeric distribution is about 20% 1-chloro, 20% 2-chloro and the balance a random distribution of 3-, 4-, 5-, 6- and 7-chloro isomers of said monochlorinated paraffins.

5. A process according to claim 1 in which the $C_2$ to $C_6$ amine is an ethylene polyamine.

6. A process according to claim 1 in which said reaction is effected at a temperature between about 90° C. and 110° C.

7. A process according to claim 1 wherein the molar ratio of said amine to said chlorinated or brominated hydrocarbon is from about 20:1 to 50:1.

8. A process according to claim 1 wherein said long chain amine product is separated from said drawn off reacted mixture by adding to the reaction mixture water and carbon dioxide to form an aqueous solution of long chain amine carbonate complex, extracting said solution with methanol, and volatilizing said methanol and water to separate said long chain amine product.

References Cited
UNITED STATES PATENTS

| | | | |
|---|---|---|---|
| 3,436,420 | 4/1969 | Dudzinski | 260—585 AX |
| 3,497,555 | 2/1970 | Dudzinski | 260—585 AX |
| 3,471,562 | 10/1969 | Wakeman et al. | 260—585 AUX |
| 3,671,511 | 6/1972 | Honnen et al. | 260—583 PX |
| 3,657,347 | 4/1972 | Muller et al. | 260—583 RX |
| 3,548,001 | 12/1970 | Dudzinski | 260—583 R |

JOSEPH P. BRUST, Primary Examiner

U.S. Cl. X.R.

260—583 R, 584 R